United States Patent

[11] 3,548,863

[72] Inventor Alvin C. Stippich
  Waukesha, Wis.
[21] Appl. No. 861,238
[22] Filed Sept. 26, 1969
[45] Patented Dec. 22, 1970
[73] Assignee Riverside Mold & Die, Inc.
  Waukesha, Wis.
  a corporation of Wisconsin

[54] BAFFLE FOR COOLANT PASSAGES IN PLASTIC MOLDING DIES
  10 Claims, 8 Drawing Figs.
[52] U.S. Cl. ................................................. 137/340, 138/117
[51] Int. Cl. ................................................. F16l 53/00
[50] Field of Search ......................................... 137/340, 338, 592; 138/117, 115

[56] References Cited
UNITED STATES PATENTS

| | | | |
|---|---|---|---|
| 2,802,089 | 8/1957 | Beck | 137/340X |
| 2,929,408 | 3/1960 | Weatherwax et al. | 138/117X |
| 3,110,754 | 11/1963 | Witort et al. | 138/115X |

FOREIGN PATENTS

| | | | |
|---|---|---|---|
| 823,864 | 12/1951 | Germany | 138/115 |
| 427,293 | 11/1947 | Italy | 137/338 |

Primary Examiner—M. Cary Nelson
Assistant Examiner—Michael O. Sturm
Attorney—Ira Milton Jones ABSTRACT: An elongated plastic stem with a threaded plug at one end thereof and fins radiating therefrom is screwed into the open end of a liquid circulating bore in a die to divide the bore into longitudinally extending passages and cause the liquid to flow serially back and forth in the bore.

PATENTED DEC 22 1970
3,548,863
SHEET 1 OF 2
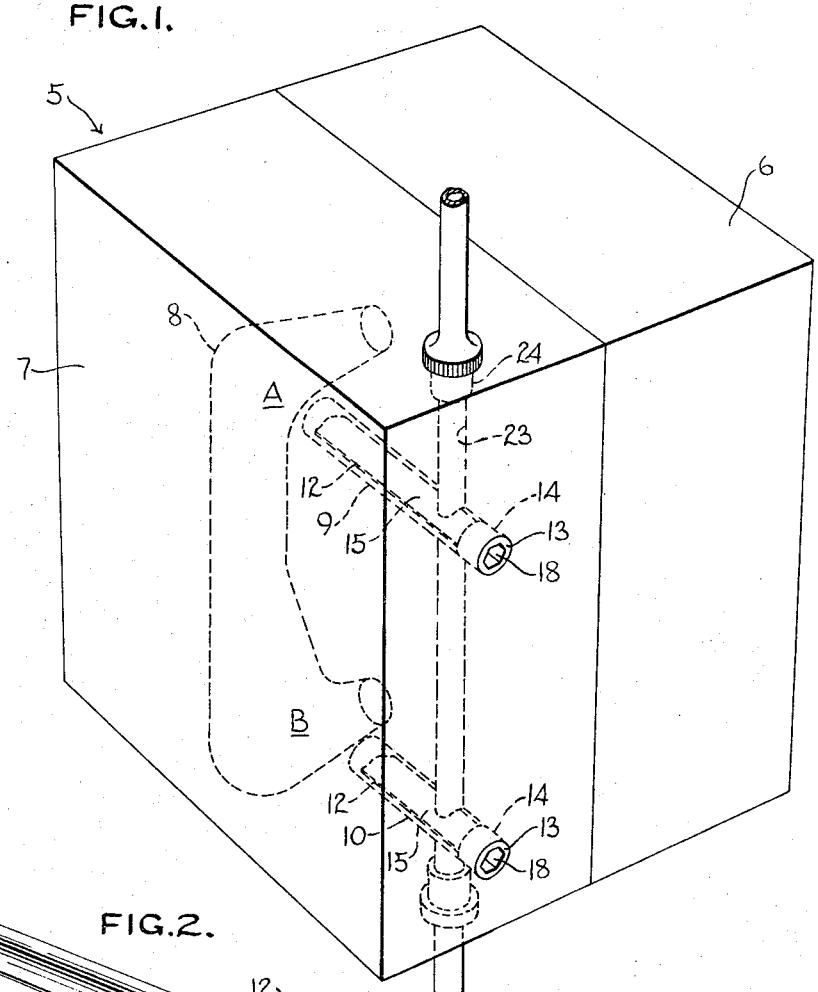
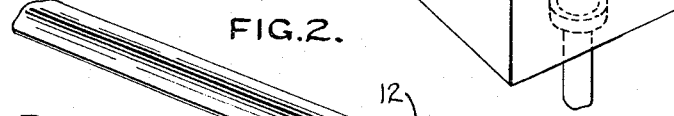
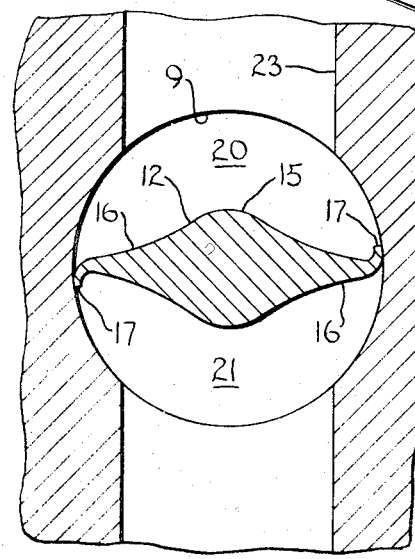
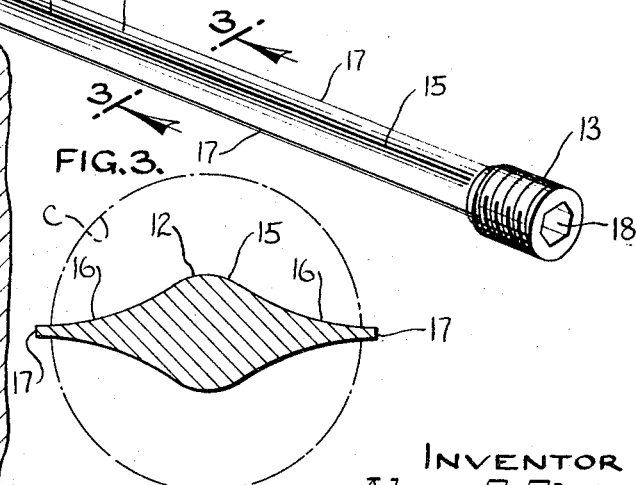
INVENTOR
*Alvin C. Stippich*
BY *Ira Milton Jones*
ATTORNEY

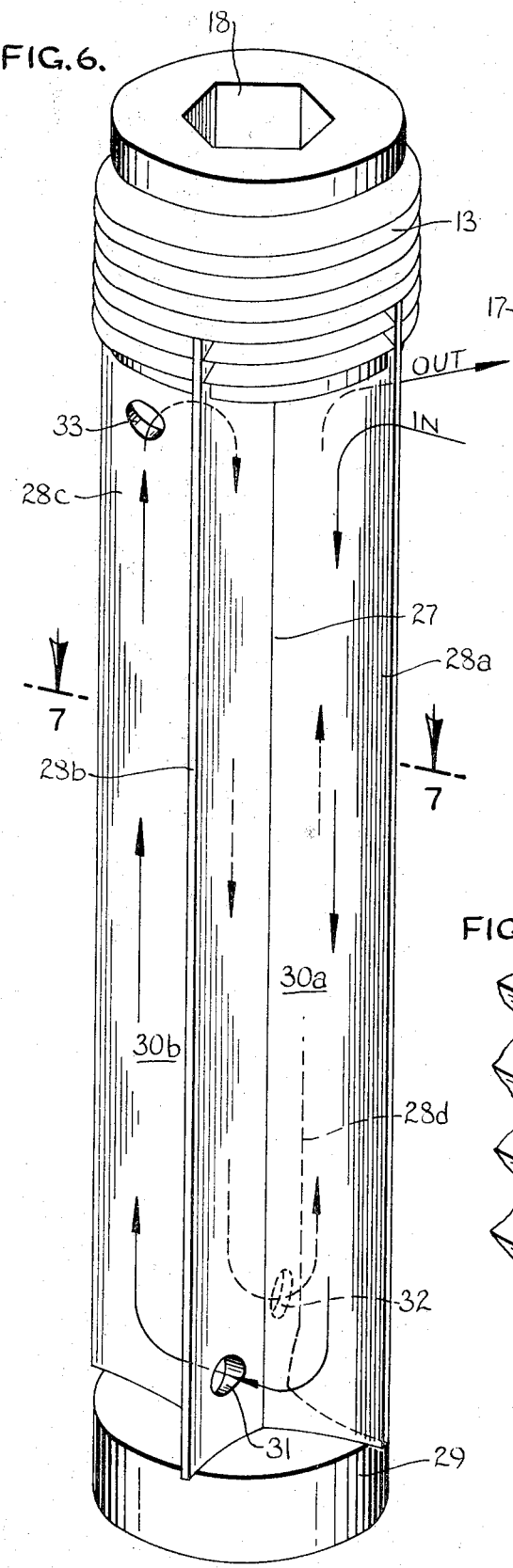
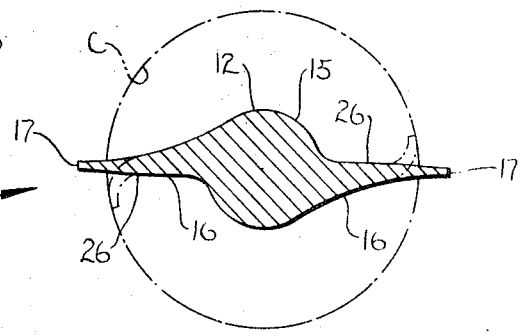
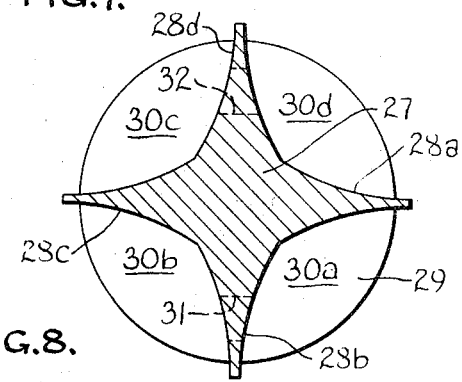
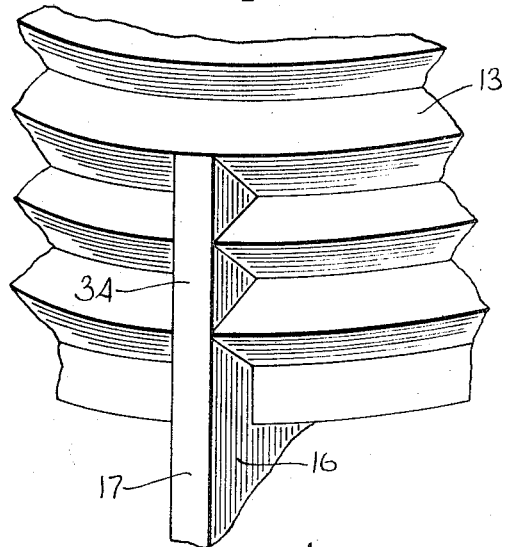

BAFFLE FOR COOLANT PASSAGES IN PLASTIC MOLDING DIES

This invention relates to flow directing baffles that are inserted into liquid circulating bores in dies and especially plastic molding dies, to maximize heat transfer between the dies and the circulating liquid. Usually the liquid is a coolant to carry away heat from portions of the dies which would otherwise become too hot for good molding, but there are also situations where it is necessary to introduce heat to some portion of a die, in which event the circulated liquid would be hot.

Obviously, where at all possible, the passages through which the liquid—either coolant or heating—circulates, are formed by bores that extend straight through the die, but often the configuration of the part to be molded makes it impossible to use such straight through bores.

In such instances, it is customary to drill holes into the die at available locations to a depth which will bring liquid flowing into and out of the resulting bores close enough to the portion of the die requiring temperature control. To effect such in and out flow, it is of course necessary that the bores be divided into separate longitudinally extending passages that are communicated at the inner end of the bore and have their outer ends connected with liquid supply and return lines.

Heretofore, these baffles were specially made by the die maker of some suitable metal and simply driven into the bore, the mouth of which was then closed by screwing a threaded plug into it. Aside from the cost of handling the baffling requirement in this special, somewhat makeshift manner, the necessary fluidtight fit between the baffle and the wall of the bore was generally difficult to achieve.

With a view to eliminating the problems heretofore encountered by the die maker confronted with the need for incorporating baffled liquid circulating bores in a die, this invention has as its purpose and object the provision of an inexpensive all plastic baffle which is readily inserted into a liquid circulating bore and which when in position has such tight sealing engagement with the wall of the bore that the liquid is positively forced to flow to and from the bottom of the bore notwithstanding irregularities in the bore wall.

Another object of this invention is to provide a baffle for the purpose described which can be removed without injury to itself or to the wall of the bore when such removal is needed for cleaning the bore.

With these observations and objectives in mind, the manner in which the invention achieves its purpose will be appreciated from the following description and the accompanying drawings which exemplify the invention.

The accompanying drawings illustrate three complete examples of embodiments of the invention constructed according to the best modes so far devised for the practical application of the principles thereof, and in which:

FIG. 1 is a perspective view diagrammatically illustrating a plastic molding die equipped with baffles in accordance with this invention;

FIG. 2 is a perspective view of one of the baffles employed in the die of FIG. 1;

FIG. 3 is a cross-sectional view through FIG. 2 on the plane of the line 3–3;

FIG. 4 is a sectional view similar to FIG. 3 but showing the baffle in position in a liquid circulating bore of a size for which the baffle is designed;

FIG. 5 is a cross-sectional view through a baffle having a somewhat modified cross section;

FIG. 6 is a perspective view of another form of the baffle;

FIG. 7 is a cross-sectional view through FIG. 6 on the plane of the line 7–7; and FIG. 8 is a fragmentary detail view in perspective showing a feature of the invention.

Referring to the accompanying drawings, the numeral 5 designates generally a plastic molding die having complementary sections 6 and 7. When mounted in a plastic molding press the die sections are moved relatively to one another to and from the closed position in which they appear in FIG. 1 and in which they conjointly define a cavity or mold 8 into which hot molten plastic is forced to produce the desired part. Obviously, of course, the die sections must be equipped with means for mounting them in a press and one of them must have a sprue through which the plastic is forced into the mold. For sake of simplicity and clarity of disclosure these details are not even indicated in FIG. 1.

Upon the assumption, for purposes of illustration, that the configuration of the part to be molded is such that two zones A and B in the die require cooling and also that the configuration of the mold precludes drilling coolant passages straight through the die, two holes 9 and 10 are drilled into at least one of the sections of the die, from an accessible face thereof. These drilled holes have their inner ends sufficiently close to the zones A and B that coolant flowing into and out of the bores formed by the drilled holes can control and maintain the temperature at these zones at the correct value if the coolant constantly flows all the way to and from the bottom or inner end of the bores. To assure this result it is necessary to divide the bores into inlet and outlet passages which communicate only at the bottom or inner end of the bores. This is the purpose of the baffle 12 of this invention one form of which is best illustrated in FIG. 2, and one of which is shown in position in each of the two bores 9 and 10 in FIG. 1.

The baffle 12 is molded of plastic such as nylon and comprises a threaded plug 13 of a size to be screwed into the tapped mouths 14 of the bores 9 and 10, and a stem 15 projecting from the inner end of the plug coaxially therewith. The stem 15 has a pair of fins 16 projecting laterally from and integral with the opposite sides of the stem. The stem may be considered as being round or circular in cross section and the fins are progressively thicker in cross section from their outer edges 17 to their junctions with the stem. As shown in FIG. 3 the opposite sides of the fins are concave and merge smoothly into or with the cylindrical surface of the stem. Essentially, therefore, the thickness of the fins progresses substantially exponentially.

As also shown in FIG. 3, the distance between the outer edges 17 of the diametrically opposite fins is greater than the diameter of a bore of the size for which the baffle is designed, the bore being depicted in FIG. 3 by the dot and dash circle C. Insertion of the baffle into the bore thus entails some displacement of the outer edge portions of the fins and to accommodate this displacement the outer edge portions of the fins are quite thin and resiliently deformable. Preferably also at the end of the baffle remote from its threaded plug 13 the fins are tapered or rounded to facilitate entry into the bore.

During insertion of the baffle into a bore the baffle is pushed in far enough to engage the threads of the plug with those of the tapped mouth of the bore whereupon torque is applied to the baffle by an appropriate tool inserted into a noncircular socket 18 in the plug. As the baffle is thus turned the resiliently yieldable edge portions of the fins are deflected as shown in FIG. 4, and because of the memory factor of plastic these thin edge portions will hug the wall of the bore with a fluid tight fit notwithstanding irregularities in the wall surface. The bore is thus divided into two separate passages 20, 21 (FIG. 4) which are communicated only at the bottom or inner end of the bore by virtue of the baffle being shorter than the depth of the bore.

Since it is important that the liquid be forced to the very bottom of the bore in order to effectively control the temperature at the zones A and B, the baffle should reach to a point as close to the bottom of the bore as possible without restricting the flow from one side to the other of the baffle. This objective is easily achieved with the baffle of this invention, since the baffle can be made long enough to be used in the deepest bore that might be encountered and then by simply cutting off a portion thereof it can be fitted to a bore of less depth.

With the baffle in place dividing the bore into the passages 20, 21, the temperature controlling liquid is introduced into one of the passages near its outer end which is closed by the threaded plug, and discharged from the other passage, also near the outer end thereof. While this might be done individually for each bore—and would be if only one bore is needed—where a plurality of bores are required they are preferably connected in series as shown in FIG. 1. As there shown a cross bore 23 enters the die section 7 at one face thereof and leaves the same at the opposite face, and in passing through the die section intersects the bores 9 and 10 near the outer ends thereof. One end of the bore 23 provides an inlet 24 to which the temperature controlling medium may be fed from a source thereof, while its other end serves as an outlet through which the liquid medium flows for recirculation.

In the absence of baffles in the bores 9 and 10 they would simply fill up with stagnant liquid and defeat their purpose. The baffles are therefore essential and of course they must be so disposed that they block any direct flow through the bore 23 and instead force the flow down one side of the baffles to the very bottom of the bores 9 and 10 and up the other side thereof. To assure this result the cross bore 23 must be somewhat smaller in diameter than the bores 9 and 10 so that the edges of the fins have fluid tight engagement with the wall of the bores 9 and 10 between the junctions thereof with the cross bore 23. This is illustrated in FIG. 4. Also to prevent any leakage past the baffles the edges of the fins must be proof against being cut or in anywise defaced by any possible irregularities in the walls of the bores 9 and 10. This possibility, obviously, is most acute at the intersections of the bores 9 and 10 with the cross bore 23 due to the sharp edges which these intersections form and across which the edges of the baffles must slide during their insertion. The plastic baffles of this invention have been found to be entirely reliable and successful in this respect.

Nor are the baffles damaged or in anywise rendered less reliable by their removal which is necessary on occasion to permit the bores 9 and 10 to be cleaned.

While the symmetrical cross-sectional shape of the baffles, best shown in FIG. 3, has been found entirely satisfactory, somewhat better results are had with the modified cross section shown in FIG. 5. In this case one side of each fin, the trailing side 26 during inserting rotation of the baffle, is substantially flat. This seems to allow the fins to more readily adjust themselves to any irregularities in the wall surfaces of the bores into which the baffles are inserted.

For some situations it may be desirable to cause the temperature controlling liquid to flow back and forth in a bore several times before it leaves the same. The modified baffle shown in FIGS. 6 and 7 is admirably suited to that purpose. In this case there are more than two, but always an even number of fins radiating from the central stem 27. Four such fins 28 a, b, c, and d are employed in the illustrated baffle, but more fins could be used if desired. In any event the fins extend from the threaded plug 13 for the full length of the stem to a cylindrical boss 29 which is integral with the fins 28 and the stem. The diameter of this boss is such as to fit snuggly into a bore of the size for which the baffle is designed.

The threaded plug, the baffles, the cylindrical boss and the wall of the bore in which the baffle is located, thus coact to form four separate passages 30 a, b, c and d. These passages are communicated through ports so located with respect to one another that fluid fed into one of the longitudinal passages 30 must flow serially in and out of all of the passages before it can leave the bore.

To be more specific, in the baffle shown in FIGS. 6 and 7, the fin 28a has no port but the adjacent fins 28b and 28d have ports located adjacent to the cylindrical boss 29 and respectively designated 31 and 32; and the remaining fin 28c has a port 33 near the threaded plug. Accordingly fluid fed into the passageway 30a through a suitable inlet duct provided in the body of the die and opening to the bore in which the baffle is located near its tapped mouth, can only leave the same through the port 31 which debouches into the passage 30b. The fluid then flows in the opposite direction through passage 30b to port 33 which leads to passage 30c. Now the fluid flows down passage 30c to port 32, through this port and up passage 30d to an outlet also provided in the body of the die.

Since the outer edges of the fins 28 must have an assured fluidtight fit with the wall of the bore they of course project beyond the periphery of the cylindrical boss as shown in FIG. 7.

Finally, to guard against any possible leakage between the threaded plug 13 and the tapped mouth 14 of the bore, the outer edge portion of at least one of the fins is extended across one or two threads of the plug, as shown at 34 in FIG. 8. This feature is employed in all forms of the baffle.

Those skilled in the art will appreciate that the invention can be embodied in forms other than as herein disclosed for purposes of illustration, and that although the baffle of the invention is especially well adapted for use in controlling flow in liquid circulating holes drilled into plastic molding dies, it is by no means limited to that use but can be employed to advantage in any situation where it is necessary to direct flow of fluid either liquid or gas, in a straight bore.

I claim:

1. A baffle for dividing a fluid circulating bore into longitudinally extending passages which serially connect an inlet and an outlet, both of which open to the bore near its mouth, to thus cause fluid entering the inlet to flow a defined distance into the bore and back before it reaches the outlet, said baffle being formed of elastically deformable material and comprising:
   A. an elongated stem projecting from and nonrotatably connected with a plug which is adapted to be inserted into the mouth of the bore;
   B. fins projecting laterally from the stem, said fins having resiliently yieldable edge portions, the extremities of which are parallel to the central axis of the stem and spaced therefrom a distance slightly greater than the radius of a bore of the size for which the baffle is intended, so that during insertion of the baffle into the bore the edge portions of the fins are laterally deflected and because of the resilience of the fins they seek and maintain a fluidtight engagement with the wall of the bore despite any irregularities in its surface; and
   C. means for sealing the mouth of the bore.

2. A baffle for dividing a fluid circulating bore into longitudinally extending passages which serially connect an inlet and an outlet, both of which open to the bore near its mouth, to thus cause fluid entering the inlet to flow a defined distance into the bore and back before it reaches the outlet, said baffle being formed of elastically deformable material and comprising:
   A. an elongated stem projecting from and nonrotatably connected with an externally threaded plug which is adapted to be screwed into the mouth of the bore to close the same with the stem extending axially into the bore; and
   B. fins projecting laterally from the stem, said fins having resiliently yieldable edge portions, the extremities of which are parallel to the central axis of the stem and spaced therefrom a distance slightly greater than the radius of a bore of the size for which the baffle is intended, so that during insertion of the baffle into the bore and rotation thereof incident to screwing its plug into the mouth of the bore, the edge portions of the fins are laterally deflected and because of the resilience of the fins they seek and maintain a fluidtight engagement with the wall of the bore despite any irregularities in its surface.

3. The baffle of claim 2, wherein the stem is integral with the plug.

4. The baffle of claim 3, wherein the fins are integral with the stem.

5. The baffle of claim 4, wherein the edge portion of at least one of the fins extends across at least one of the adjacent threads of the plug, to be deformed into tight sealing engagement with the tapped mouth of the bore as the plug is screwed into position.

6. The baffle of claim 2, wherein the threaded plug has a noncircular socket opening to its outer end to receive a torque imparting tool.

7. The baffle of claim 4, wherein the fins are two in number and disposed at diametrically opposite sides of the stem, and wherein the stem and its integral fins are uniform in cross section for the entire length thereof.

8. The baffle of claim 7, wherein the cross-sectional shape of the baffle is symmetrical about a plane containing the axis of the stem and passing through both fins, and wherein the opposite sides of the fins are concave in cross section so that the increase in thickness of the fins is substantially exponential.

9. The baffle of claim 7, wherein the stem is essentially round in cross section, and the fins have one side thereof concave in cross section and the other side flat for part of their width, the flat sides being the trailing sides during rotation of the baffle in the direction to screw its plug into the mouth of a bore.

10. The baffle of claim 1, further characterized by:

A. a cylindrical boss integral with the stem and the fins at the end thereof remote from the plug, said boss being of a diameter to snugly fit a bore of the size for which the baffle is intended, so that when the baffle is in place in a bore, the cylindrical boss coacts with the plug, the stem and the fins to divide the bore into adjacent longitudinally extending passages, there being more than two but an even number of said fins;

B. certain of the fins having port means therethrough near the plug to communicate the passages at opposite sides thereof and certain other fins having port means therethrough near the cylindrical boss to communicate the passages at opposite sides thereof, said port means being so arranged with respect to one another that fluid introduced by an inlet leading to one of said passages near the plug flows serially through the passages to an outlet leading from another passage also near the plug.